(12) United States Patent
Mizes et al.

(10) Patent No.: US 7,283,143 B2
(45) Date of Patent: Oct. 16, 2007

(54) MEASUREMENT AND CONTROL OF HIGH FREQUENCY BANDING IN A MARKING SYSTEM

(75) Inventors: Howard A. Mizes, Pittsford, NY (US); Beilei Xu, Penfield, NY (US); Chu-heng Liu, Penfield, NY (US); Robert P. Loce, Webster, NY (US); Michael D. Thompson, Rochester, NY (US); Eric S. Hamby, Fairport, NY (US); R. Enrique Viturro, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 707 days.

(21) Appl. No.: 10/852,243

(22) Filed: May 25, 2004

(65) Prior Publication Data

US 2005/0275855 A1 Dec. 15, 2005

(51) Int. Cl.
*G03G 21/00* (2006.01)
(52) U.S. Cl. .......................... 347/132; 399/15; 399/49; 399/72
(58) Field of Classification Search ................. 399/49, 399/15, 72; 347/132–133, 236–237, 246–247
See application file for complete search history.

(56) References Cited

U.S. PATENT DOCUMENTS 7,120,369 B2* 10/2006 Hamby et al. ................ 399/49

* cited by examiner

*Primary Examiner*—Huan Tran
(74) *Attorney, Agent, or Firm*—Oliff & Berridge, PLC

(57) ABSTRACT

A method of measuring and controlling high frequency banding, the method includes creating a test pattern, sensing the test pattern with optical sensors, determining a beat frequency based on the sensed test pattern, and determining the frequency, phase and amplitude of high frequency banding based on the beat frequency. An exemplary embodiment of a feedback control method for controlling high frequency banding includes creating a test pattern, sensing the test pattern with optical sensors, measuring high frequency banding and adjusting the imaging parameters based on the measured high frequency banding in order to decrease the extent of high frequency banding. Moreover, an exemplary embodiment of a system for measuring high frequency banding includes an image marking device having a receiving member, optical sensors arranged on the receiving member, and a controller that is functionally coupled to the optical sensors and to the marking device.

62 Claims, 11 Drawing Sheets

MEASUREMENT AND CONTROL OF HIGH FREQUENCY BANDING IN A MARKING SYSTEM

BACKGROUND OF THE INVENTION

1. Field of Invention

This invention relates to marking systems in general and in particular to high frequency banding in marking systems.

2. Description of Related Art

The image quality defect known as banding is, within a printed image, a periodic modulation of lightness and darkness on a printed medium that runs in the marking process direction. Moreover, banding amplitude can change over time to produce different banding characteristics for printed images produced at different times. Banding and high frequency banding generally occur across the full width of an image, and may vary in amplitude in both time and in the direction perpendicular to the marking process direction, i.e., the cross-process direction. Banding and high frequency banding can be caused by a number of fluctuations that occur within the subsystems of a marking engine such as, for example, laser polygon Raster Optical Scanner (ROS) facet-to-facet reflectivity variation, intensity and spot size variation in a multibeam ROS, ROS polygon wobble, and photoreceptor velocity modulation.

A conventional approach to eliminate banding defects is generally to require the manufacture of parts/subsystems to tight tolerances. Alternative approaches include using active compensation schemes. For instance, a compensation scheme has been proposed wherein banding defects are being sensed with optical sensors in the developed image on the photoreceptor in real time, and then the development field is actuated according to a feedback control strategy in order to prevent the formation of the bands. In such an approach, accurate sensing of banding defects plays a critical role in the effectiveness of the compensation.

Generally, two types of sensors have been utilized to detect banding: toner area coverage sensors which are point sensors and array sensors. Toner area coverage sensors generally possess large apertures, and thus cannot resolve high frequency banding if the period is smaller than the size of the aperture. On the other hand, full-width array sensors typically provide high resolution in the cross-process direction. However, constraints on cost, limitations on the illuminator exposure intensity, and/or limitations on the size and processing of the collected image may require the sensor to have a relatively long integration time in the process direction. This long integration time generally prevents the detection of high frequency banding using these conventional data extraction techniques.

Generally, it is desirable to measure banding frequency, phase and/or amplitude using a single test pattern. Methods that are capable of identifying periodic patterns of unknown frequency and angle are generally well known in the field of halftone screening. An example includes screen finders for halftone screen identification. These methods utilize the moiré patterns caused by the interaction between two periodic functions one superimposed, scanned or rescreened. However, the design of moiré image patterns and the associated detection methods are generally not suitable for banding measurement within a marking device.

SUMMARY OF THE INVENTION

In light of the above described problems and shortcomings, various exemplary embodiments of the systems and methods according to this invention provide for a method of measuring high frequency banding which includes creating a test pattern, sensing the test pattern with one or more sensors, determining a beat frequency based on the sensed test pattern and determining a frequency, phase, and/or amplitude of the higher frequency banding based on the determined beat frequency, phase, and amplitude.

Various exemplary embodiments of the systems and methods according to this invention also provide for a feedback control method of controlling high frequency banding, the method including creating a test pattern, sensing the test pattern with one or more sensors, measuring high frequency banding from the sensed pattern, and adjusting imaging parameters based on the measured high frequency banding.

Moreover, according to various exemplary embodiments of the systems and methods of this invention, a method of measuring high frequency banding amplitude is also disclosed, which includes creating a test pattern, imaging the test pattern with an array-type sensor, averaging individual pixel responses of each sensor of the array-type sensor to extract a profile in a cross process direction, determining the amplitude of the periodic signal from the extracted profile across the array-type sensors, and determining an amplitude of high frequency banding based on the determined amplitude of the periodic signal.

According to various exemplary embodiments of the systems and methods of this invention, a system for measuring high frequency banding in a marking device with a receiving member is disclosed. The system includes optical sensors arranged on the receiving member, the optical sensors sensing a test pattern, a controller functionally coupled to the optical sensors and to the marking device, the controller determining a beat frequency based on the sensed test pattern, the controller also determining the frequency and phase of high frequency banding based on the beat frequency.

According to various exemplary embodiments of the systems and methods of this invention, a system for measuring high frequency banding amplitude in a marking device with a receiving member is disclosed. The system includes array-type sensors arranged on the receiving member, the sensors sensing a test pattern, a controller functionally coupled to the sensors and the marking device and capable of measuring an array type signal for the imaged test pattern, the controller extracting the amplitude of the periodic signal and determining the amplitude of high frequency banding based on the extracted amplitude of the periodic signal.

Furthermore, a xerographic marking device is disclosed, which comprises optical sensors, at least one of either an electromechanical actuator, and/or an exposure actuator, and a controller functionally coupled to the optical sensor, the electromechanical actuator and the exposure actuator.

Further, a machine readable medium is disclosed, that provides instructions for controlling high frequency banding on a receiving member in a xerographic marking device, the instructions, when executed by a processor, cause the processor to perform operations that include creating a test pattern, sensing the test pattern with sensors, determining a beat frequency, and determining a frequency and phase of the high frequency banding based on the determined beat frequency and phase.

According to various exemplary embodiments of the systems and methods of this invention, a machine readable medium is disclosed that provides instructions to create a test pattern, sense the test pattern with one or more sensors, measure high frequency banding and adjust the imaging parameters based on the measured high frequency banding.

Further, a machine readable medium is disclosed, that provides instructions to a processor, to create a test pattern, image the test pattern with array type sensors, measure the signal from the array type sensors, extract the amplitude of the periodic signal from the measured signal and determine an amount of high frequency banding based on the amplitude of the extracted periodic signal.

BRIEF DESCRIPTION OF THE DRAWINGS

Various exemplary embodiments of the systems and methods of this invention will be described in detail, with reference to the following figures, wherein.

DETAILED DESCRIPTION OF PREFERRED EMBODIMENTS

These and other features and advantages of this invention are described in, or are apparent from, the following detailed description of various exemplary embodiments of the systems and methods according to this invention.

Figure 1:
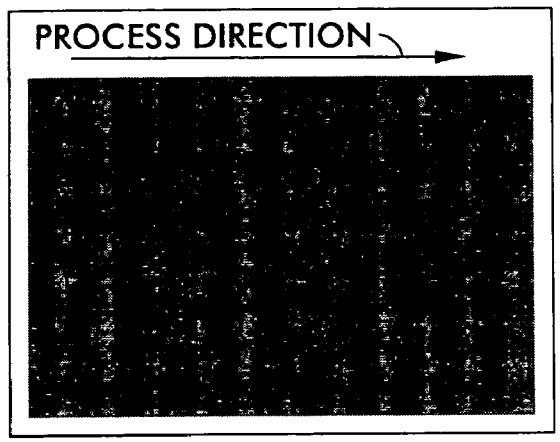
FIG. 1 is an illustration of an example of image banding.

FIG. 1 is an illustration of an example of image banding. In FIG. 1, the image is alternately dark and light in the direction in which the image is formed, i.e., the process direction. Banding is a periodic modulation of a print with regularly spaced peaks and troughs that run in the cross-process direction. High frequency banding is a banding at a spatial frequency that is high compared to the resolution of the sensor. Specifically, the transition to high frequency banding occurs when the sampling rate of the sensor is slower than the Nyquist frequency of the banding.

Figure 2:
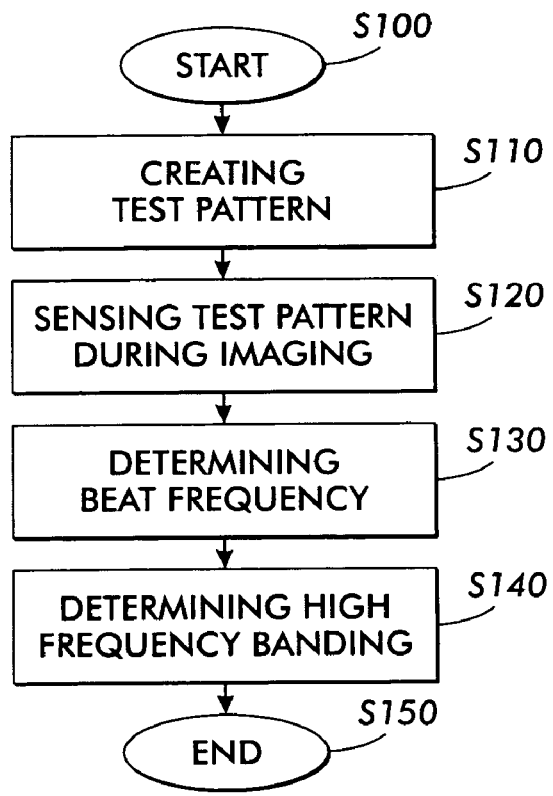
FIG. 2 is a flowchart illustrating the method of determining high frequency banding according to various exemplary embodiments.

FIG. 2 is a flowchart illustrating a method of determining the frequency, phase, and amplitude of high frequency banding. The method starts at step S100, then continues to step S110. During step S110, a test pattern is created. According to various exemplary embodiments, the test pattern is a periodic spatial representation in which the periodic pattern is arranged in the process direction. After the test pattern is created during step S110, control continues to step S120.

During step S120, according to the preferred various exemplary embodiments, the test pattern is imaged in a marking device and is sensed by one or more optical sensors inside the marking device, i.e., in situ. According to alternative various exemplary embodiments, the one or more optical sensors could be located outside the print engine. Once the test pattern is sensed in step S120, control continues to step S130, where a beat frequency is determined based on the measured signal sensed by the one or more optical sensors of the test pattern. According to various exemplary embodiments, the beat frequency is determined based on a result of the interaction between the high frequency banding of the marking device and the periodic frequency of the test pattern created during step S110. After the beat frequency is determined in step S130, control continues to step S140.

During step S140, according to various exemplary embodiments, the frequency, phase and amplitude of high frequency banding of the marking device are determined on the basis of the beat frequency, phase, and amplitude determined in step S130. Following the determination of the phase, frequency and amplitude of high frequency banding, control continues to step S150 where the method ends.

According to various exemplary embodiments, the test pattern created during step S110 can be similar to a fan pattern, with lines originating from the same point and evolving in an outwards direction, or a "falling domino" pattern, which is a series of substantially parallel and diagonal lines with their progressively lowering angle, or a series of substantially parallel diagonal lines where the inclination angle is constant. Moreover, according to various exemplary embodiments, the test pattern created during step S110 is a periodic variation of gray level in the process direction. Also, according to various exemplary embodiments, sensing of the test pattern in step S120 may be performed by optical sensors that can be either array-type optical sensors or point optical sensors.

Figure 3:
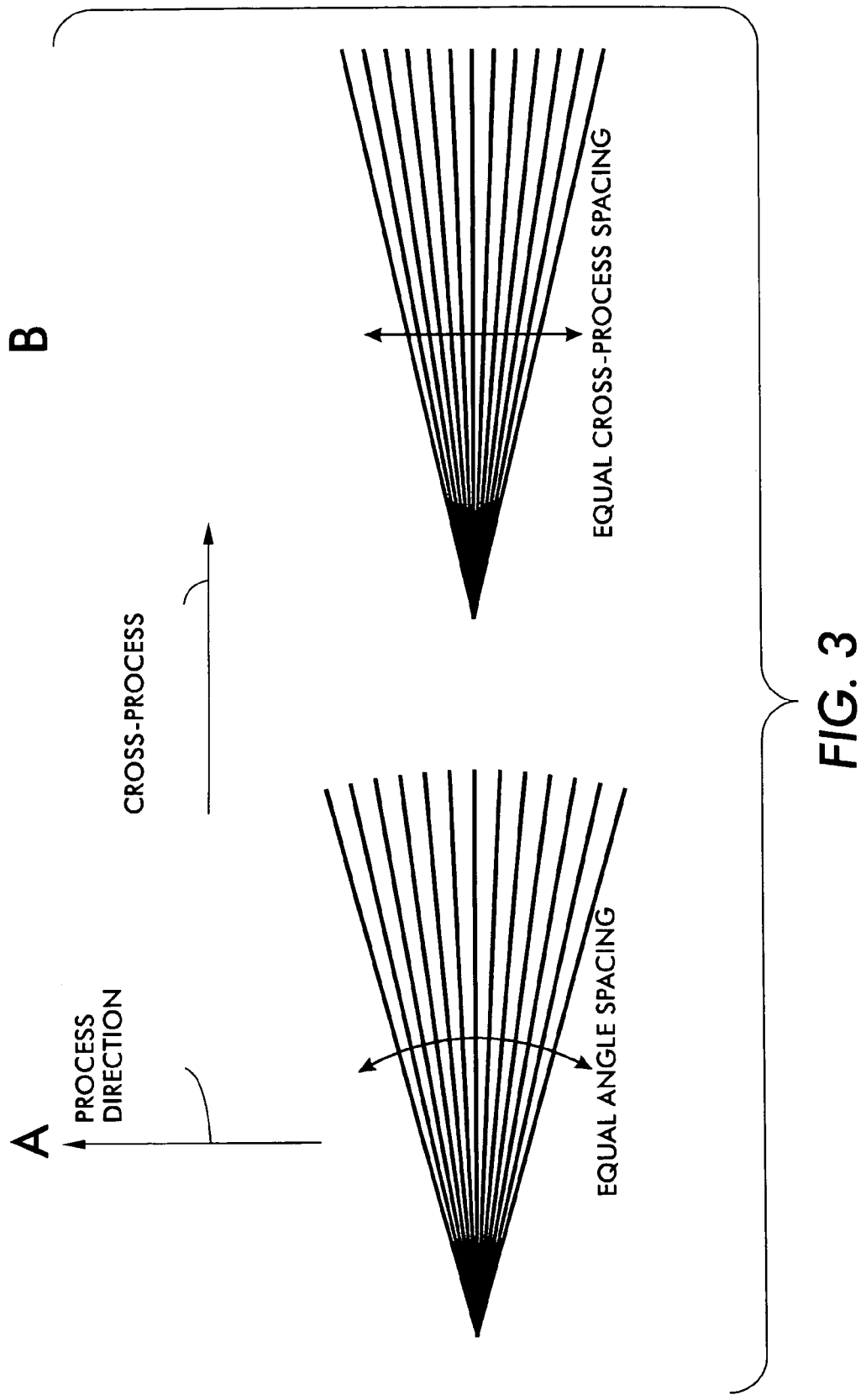
FIGS. 3A and 3B illustrate test patterns used in the determination of high frequency banding according to various exemplary embodiments.

FIGS. 3A and 3B are illustrations of two possible test patterns according to various exemplary embodiments of this invention. FIG. 3A represents a test pattern configured as a fan of lines that are separated by the same angle from each other, but originating from the same point. The lines in the fan pattern evolve outwardly, which corresponds to a continuum of frequency. In FIG. 3A, the continuum of frequency evolves in an arc-like shape, as shown by the arc-shaped arrow. However, in FIG. 3B, which is a fan pattern where the lines are equidistant from each other in the process direction (rather than separated by the same angle as in FIG. 3A), the continuum of frequency occurs in a straight line, as indicated by the vertical arrow in FIG. 3B. Accordingly, the beat frequency, which is the frequency of the signal resulting from the interaction between the periodicity of the fan pattern and the high frequency banding of the marking device, will correspond to the position of the vertical straight line.

As shown in FIG. 3B, the range in line spacing determines the range of frequencies that can be evaluated, where this range should be selected to cover all the possible frequencies of interest. For instance, a useful range for many digital printers may be 4 lines per inch to 60 lines per inch, which corresponds to a period of a few raster lines to a period of a few millimeters. Additionally, if a few outlying frequencies are known, the pattern can also be configured to include those frequencies within its range of frequencies. Additionally, according to various exemplary embodiments, if a specific frequency is targeted, then the fan pattern can be configured with long lines that cover only a narrow frequency range in the vicinity of the targeted frequency. Also, using curved lines where regions around a specific frequency change slowly in space, while regions between specific frequencies change more quickly in space, can also be done.

The ideal density levels of the line image should be levels that are most sensitive to banding defects for the local frequency or frequencies of interest. According to various exemplary embodiments, the fan patterns described in FIGS. 3A and 3B have achieved a high sensitivity using gray lines on a white background, where the gray level of the lines is set by observing which gray level produces the most visible banding on a gray wedge calibration image. In some instances, that level is 10% area coverage. However, according to various exemplary embodiments, the fan configuration does not need to be limited to gray lines on a white background. The line pattern may consist of two levels of gray, or of continuously fluctuating gray levels if this configuration is more sensitive than the gray/white structure. Further, any other configuration known to those skilled in the art may be used.

According to various exemplary embodiments, the contone levels of the gray lines may be used for writing the lines when the banding detecting test pattern is applied to a gray scale printer. For halftone printers, it is desirable to use a halftone that does not interfere with the detection processes or restoration of the lines. For example, halftones of certain frequencies and angle could beat with either the line frequency or the banding frequency, thereby confusing the measurement process. According to various exemplary embodiments, a high frequency line screen such as, for instance, 600 lines per inch, produce high sensitivity while not introducing artifacts that may interfere with the measurement process. Other rendering methods, such as stochastic screening and error diffusion, according to various exemplary embodiments, are also adequate. Generally, halftoning rendering methods that approach contone imaging are most sensitive.

It is generally known that rasterization of angled lines can result in a plurality of defects, such as line width variations and jaggedness. In the fan pattern configuration such as the one illustrated on FIG. 4, these defects can create patterns that have the potential to confuse the banding measurement. In much the same way as raster defects can be found when creating the line image, sampling defects can be created when sampling the printed pattern. These problems are generally referred to as aliasing, and anti-aliasing (AA) techniques are used to suppress these problems.

Figure 4:
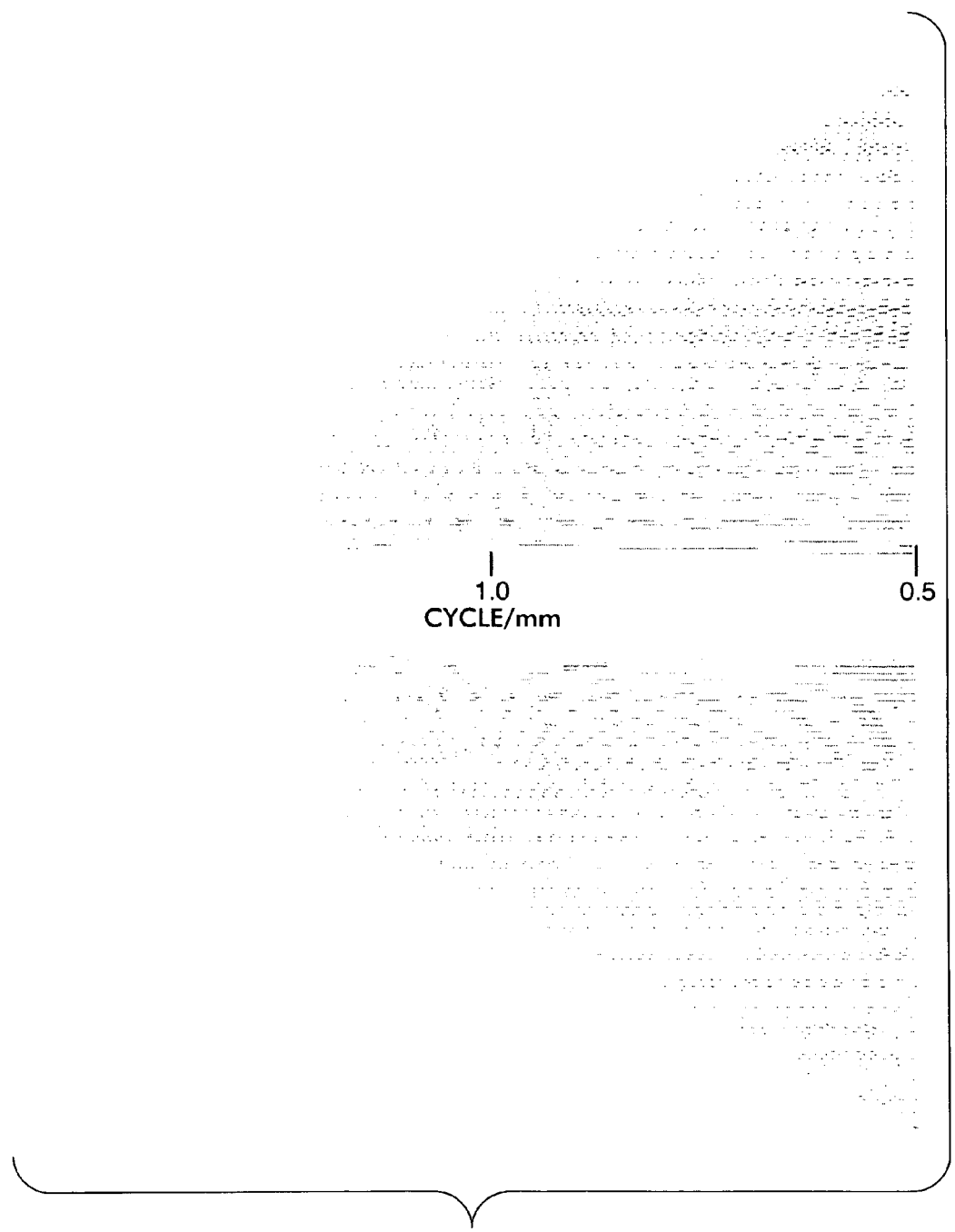
FIG. 4 is a fan pattern similar to FIG. 3B, separated into two portions, a top portion and a bottom portion according to various exemplary embodiments.

FIG. 4 is a fan pattern similar to FIG. 3B, separated into two portions, a top portion and a bottom portion. In FIG. 4, the fan pattern has a gray level of the lines of about 10% coverage. According to various exemplary embodiments, a 600 line per inch halftone screen is used so that the marking process reacts like a contone device. The simulated high frequency banding in FIG. 4 is roughly equivalent to less than one percent banding modulation. According to various exemplary embodiments, the interaction between the test pattern and the banding defect translates the high frequency banding defect to a very low frequency moiré pattern on the test pattern. The moiré pattern can be seen on FIG. 4 at around the 1 cycle/mm mark. According to various exemplary embodiments, the position of the moiré pattern in the cross process direction indicates the frequency of the banding, and the contrast of the moiré pattern corresponds to the amplitude of the banding. The phase of the high frequency banding can be estimated from the sinusoidal position of the pattern. According to various exemplary embodiments, because the banding defect is only present in the process direction, the center of the moiré pattern is generally located at the center of the test pattern in the process direction when the 2 halves are connected. According to various exemplary embodiments, if a periodic defect has a frequency component in the cross-process direction, the moiré pattern can still be observed, but the center of the moiré pattern would be off center of the test pattern. However, fan test patterns in which the lines run primarily across the process (i.e., in the cross-process direction) are generally used to detect banding in the process direction, and fan test patterns in which the lines run primarily in the process direction are generally used to detect banding that occurs across the process. Periodic banding in the diagonal direction is rare. One example of periodic banding in another, i.e., diagonal, direction is a beating between halftone and some periodic function of the marking engine. In those cases, the location of the center of the moiré pattern can be used to detect the angle of the banding. In general, the center of the moiré pattern appears at the line that is perpendicular to the banding direction.

According to various exemplary embodiments, the frequency of high frequency banding is extracted by first performing columnwise sums of the sensed test pattern by the optical sensors to the bottom and top portions of the test pattern shown on FIG. 4. Locations of maximums or minimums are extracted from the two column sums and averaged to obtain the beat frequency from which the frequency of high frequency banding is then calculated. These maximums and minimums are shown in FIGS. 6A and 6B.

Figure 5A:
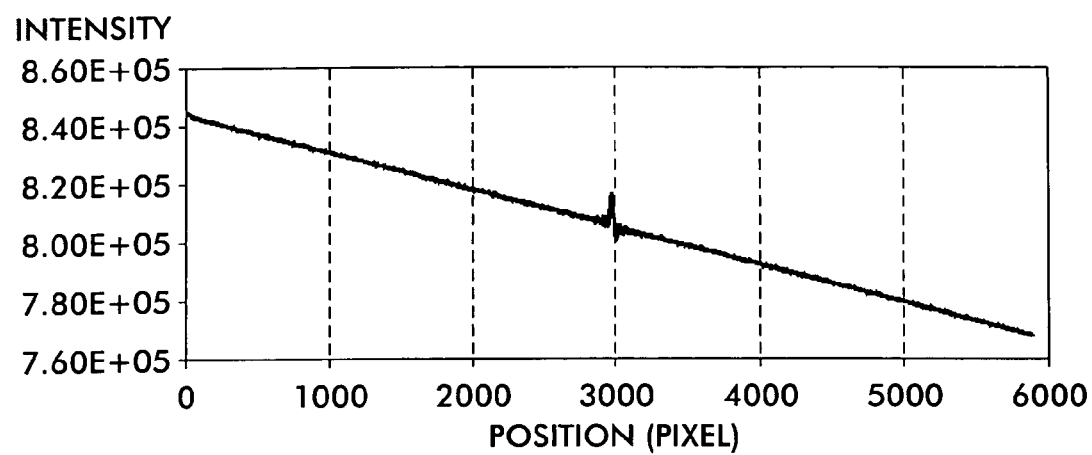
FIGS. 5A and 5B are graphs illustrating the evolution of the intensity of a sensed signal for a test pattern according to various exemplary embodiments.
Figure 5B:
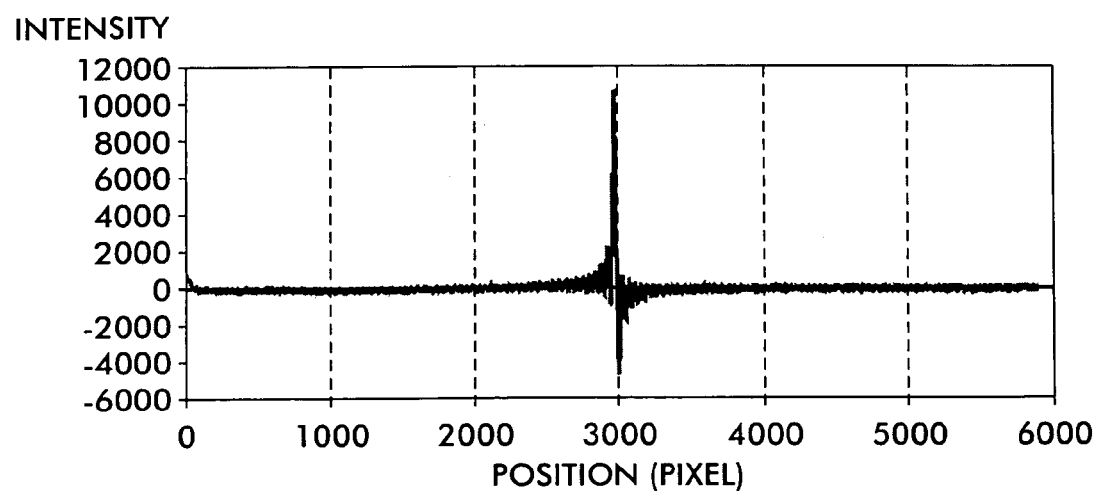

FIGS. 5A and 5B are graphs illustrating the evolution of the intensity of a sensed signal of a fan test pattern, according to various exemplary embodiments. FIG. 5A illustrates the columnwise sum of the top half of the pattern. The location of the peak in FIG. 5A indicates the beat frequency between the test pattern and the banding of the marking device. However, in order to obtain a more accurate determination of the beat frequency, further processing of the data is required. The columnwise sum illustrated in FIG. 5A results in a downward-sloping linear trend because of the fan-shaped design of the test pattern. The amount of background contribution depends on the column position in the cross-process direction, where the more background occurring within a column, the higher value of the columnwise sum sensed by the optical sensors and plotted in FIG. 5A.

FIG. 5B illustrates the same sensed signal as plotted in FIG. 5A after the downward-sloping linear trend has been subtracted from the intensity sensed by the optical sensors. According to various alternative exemplary embodiments, the test pattern can be constructed with lines that increase in width as the period increased so as to maintain the same average signal in each column except for the variation due to banding.

Figure 6A:
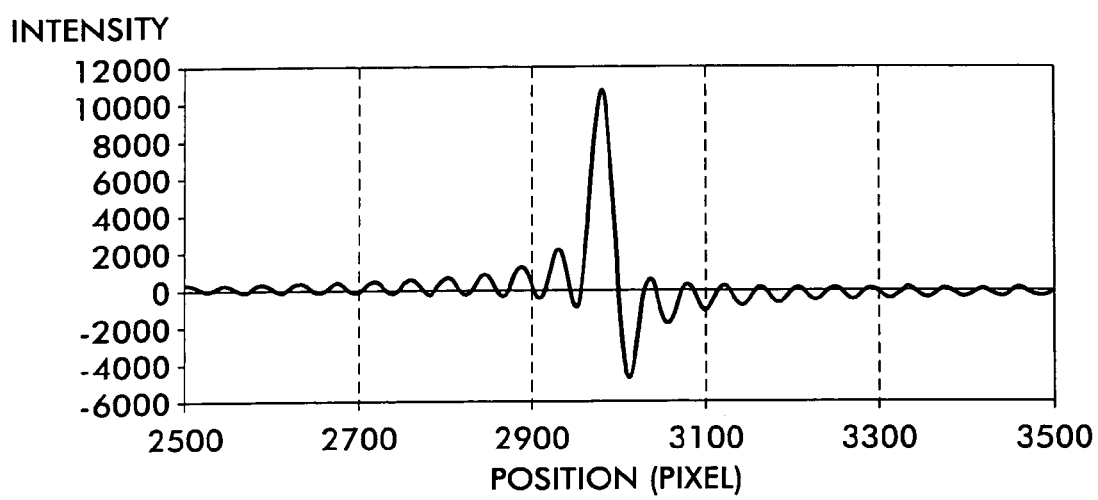
FIGS. 6A and 6B are portions of the charts shown in FIG. 5B for the top and the bottom portion of the test pattern and plotted at a smaller scale according to various exemplary embodiments.
Figure 6B:
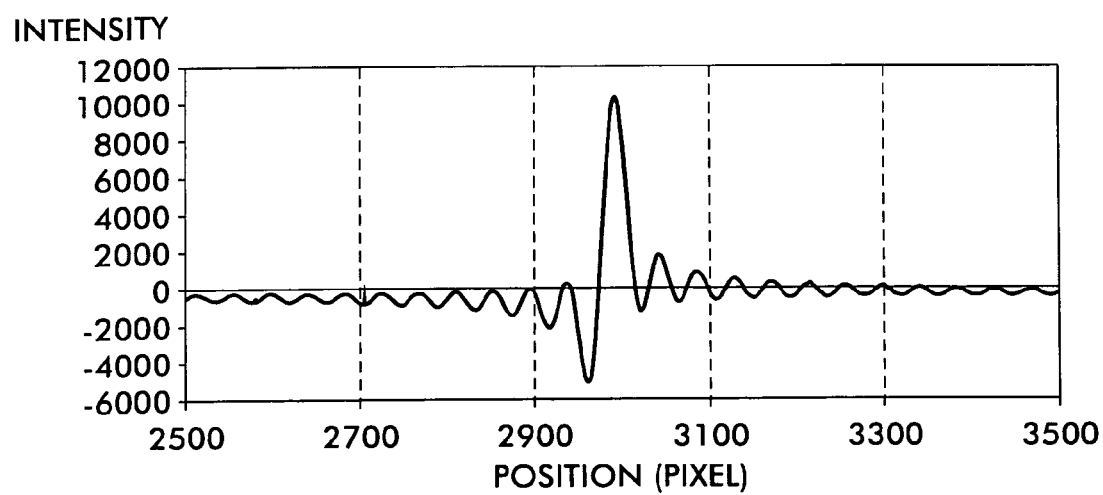

FIGS. 6A and 6B illustrate portions of FIG. 5B generated at a smaller scale, according to various exemplary embodiments, for both the top and the bottom of the fan test pattern. FIG. 6A is an enlarged view of the area in FIG. 5B where the beat frequency occurs, for the top portion of the fan test pattern. Accordingly, FIG. 6A shows more details and features of the shape and intensity of the measured optical signal for the top half of the test pattern illustrated in FIG. 4. Likewise, FIG. 6B is an enlarged view of the beat frequency as measured by the optical sensors for the bottom half of the fan test pattern illustrated in FIG. 4.

Accordingly, FIGS. 6A and 6B show, for both of the top portion and the bottom portion of the fan test pattern illustrated in FIG. 4, a maximum peak and a minimum peak. According to various exemplary embodiments, these peaks will be utilized to calculate the beat frequency and the high frequency banding.

It should be noted that, according to various exemplary embodiments, the locations of the peaks in FIGS. 6A and 6B provide an estimate of the beat frequency.

Accordingly, the beat frequency may be calculated by:

[Position of the maximum peak in the upper portion+position of the maximum peak in the lower portion]/2    (1)

Alternatively, the beat frequency may be calculated by:

[Position of the minimum peak of the upper portion+the position of the minimum peak of the lower portion]/2    (2)

Accordingly, an accurate estimation of the beat frequency that is the result of an interaction between the high frequency banding of the marking device and the periodicity of test pattern can be performed. According to various exemplary embodiments, the resolution power of the beat frequency depends on the slope of the lines in the test pattern illustrated in FIGS. 3 and 4. Accordingly, it is possible to choose between covering a large range of frequencies with a lesser resolution and covering a mirror range of frequencies with a higher resolution by creating a fan test pattern where the lines are very close to each other, or relatively far from each other.

According to various exemplary embodiments, a more accurate estimation of the beat frequency that is the result of an interaction between the high frequency banding of the marking device and the periodicity of the test pattern can be done by averaging the beat frequencies calculated through Equations (1) and (2).

In order to calculate the frequency of the high frequency banding on the basis of the determined beat frequency between the high frequency banding of the marking device and the test pattern, according to various exemplary embodiments, it is known that high frequency banding modulates local reflectance approximately at:

$$R_{hf} = R_0 + \Delta R \sin(2\pi \Omega_{hf} \times x) \quad (3)$$

where $R_{hf}$ is the reflectance of the high frequency banding at a position x in the process direction of an imprinted medium, $R_0$ is the average reflectance of high frequency banding when x=0, $\Delta R$ is the change in reflectance along the x axis in the process direction, and $\Omega_{hf}$ is the frequency of high frequency banding.

Correspondingly, since the test pattern has a periodicity, the gray level of the test pattern may be computed:

$$G_{tp} = G_0 + \Delta G \sin(2\pi \Omega_{tp} \times x) \quad (4)$$

where $G_{tp}$ is the gray level of the test pattern across the process direction x, $G_0$ is the gray level when x=0, $\Delta G$ is the change in gray level along the process direction x, and $\Omega_{tp}$ is the frequency of the test pattern.

When $\Omega_{hf}$ is close to $\Omega_{tp}$, then a low frequency beating will be introduced, and this beating frequency can then be sensed with the use of an optical sensor. In fact, the reflectance sensed by the optical sensors can be expressed in terms of the respective frequencies of high frequency banding and of the test pattern as follows:

$$R_{sensor} = R_0 + \Delta R \sin[2\pi(\Omega_{hf} - \Omega_{tp})x] \sin[2\pi(\Omega_{hf} + \Omega_{tp})x] \quad (5)$$

Generally, the optical sensors do not respond to the second sine function because the frequency is too high and cannot be detected by the sensors.

Accordingly, since the beating frequency, i.e., $\Omega_{hf} - \Omega_{tp}$ can be determined as discussed above, and since the frequency of the test pattern ($\Omega_{tp}$) is known when creating the test pattern, it is then possible to calculate the frequency of the high frequency banding.

According to various exemplary embodiments of this invention, it is also possible to determine the phase of the high frequency banding by comparing the position of the maximums, or the position of the minimums in the column sums illustrated in FIGS. 7A or 7B, to the position of the high frequency banding as calculated. In fact, the phase of high frequency banding can be calculated as follows:

Phase=(distance of the maximum peak to frequency of high frequency banding)×($\pi$/2)×(4/period of high frequency banding)    (6)

or

Phase=(distance of the minimum peak to frequency of high frequency banding)×($\pi$/2)×(4/period of high frequency banding)    (7)

According to various exemplary embodiments, it is possible to increase the accuracy of the phase measurements by averaging the calculated phase for both the top half and the bottom half of the test pattern as illustrated in FIG. 4.

Moreover, the phase can also be calculated by the distance of the minimum to the estimated high frequency banding, as shown in Equation (7), and this phase can also be averaged between the top half and the bottom half. Finally, the averaged phases calculated by the distance of the maximum to the averaged estimated frequency of high frequency banding, and by the distance of the minimum to the averaged estimated high frequency banding can then themselves be averaged for increased accuracy.

Furthermore, according to various exemplary embodiments, the amplitude of banding, which represents the extent of the high frequency banding, is correlated with the amplitude of the maximums and the minimums in the curves illustrated in FIGS. 6A and 6B.

Figure 7:
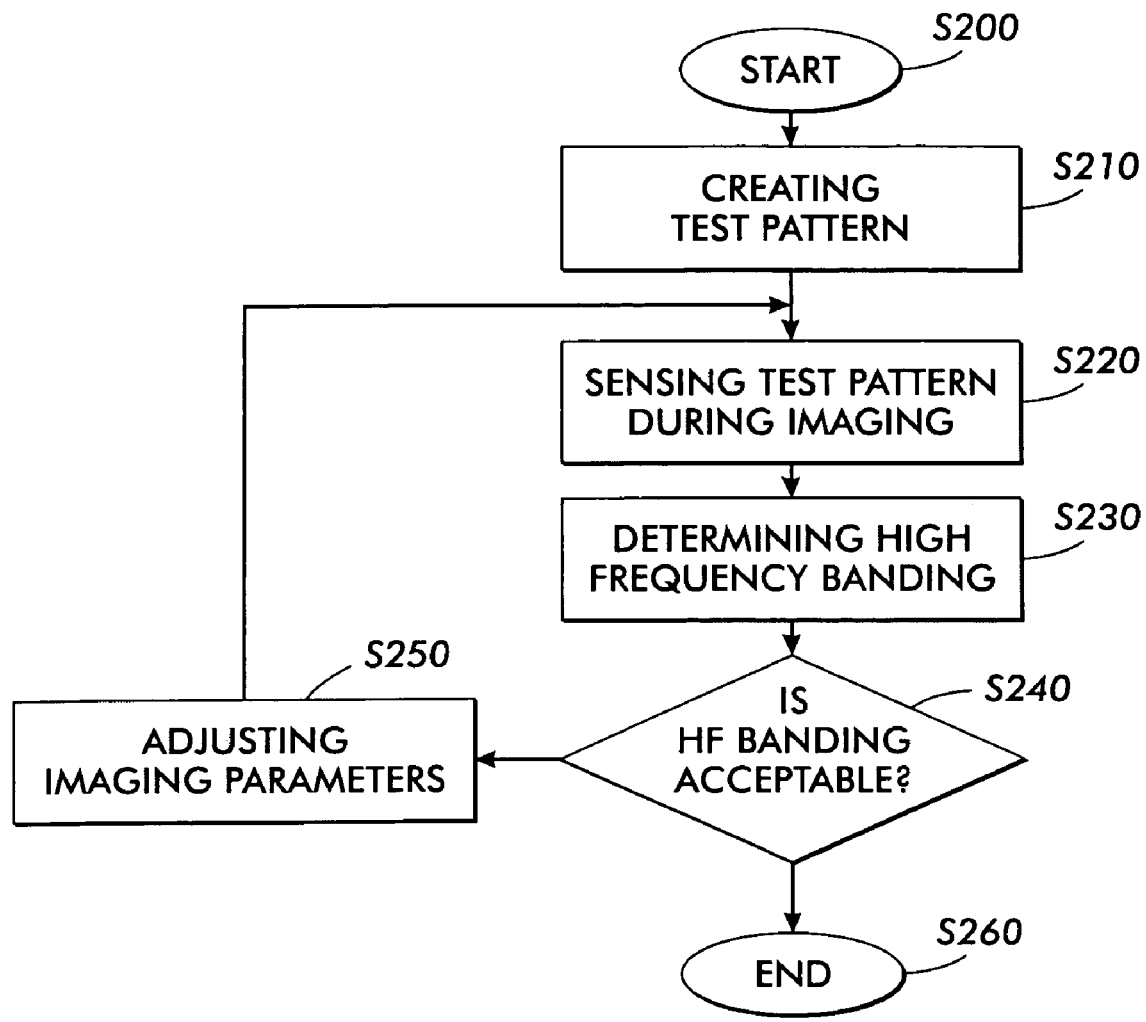
FIG. 7 is a flowchart illustrating a method of control of high frequency banding through a feedback loop according to various exemplary embodiments.

FIG. 7 is a flowchart illustrating a method to control or reduce high frequency banding through a feedback loop, according to various exemplary embodiments. The method starts in step S200, then continues to step S210 where a test pattern is created. Control then continues to step S220 where the test pattern is imaged and optical sensors sense the test pattern during the imaging process. When the test pattern sensing is completed in step S220, control continues to step S230, where the frequency, phase and amplitude of high frequency banding are determined and calculated as discussed above.

Next, control continues to step S240 where the amplitude of high frequency banding is compared to a predetermined acceptable value of high frequency banding. If the high frequency banding determined is found to be unacceptable during step S240, i.e., exceeds a predetermined high frequency banding amplitude, then control continues to step S250. In step S250, the imaging parameters are adjusted on the basis of the calculated frequency, phase and amplitude of high frequency banding. Next, control goes back to step S220 where the test pattern is again imaged and is sensed by optical sensors. Next, control continues to steps S230 and S240 as discussed above.

If the determined high frequency banding is found to be acceptable during step S240, then control goes to step S260, where the method ends.

According to various exemplary embodiments, the test pattern can be a fan pattern, a falling domino pattern or a diagonal lines pattern.

Figure 8:
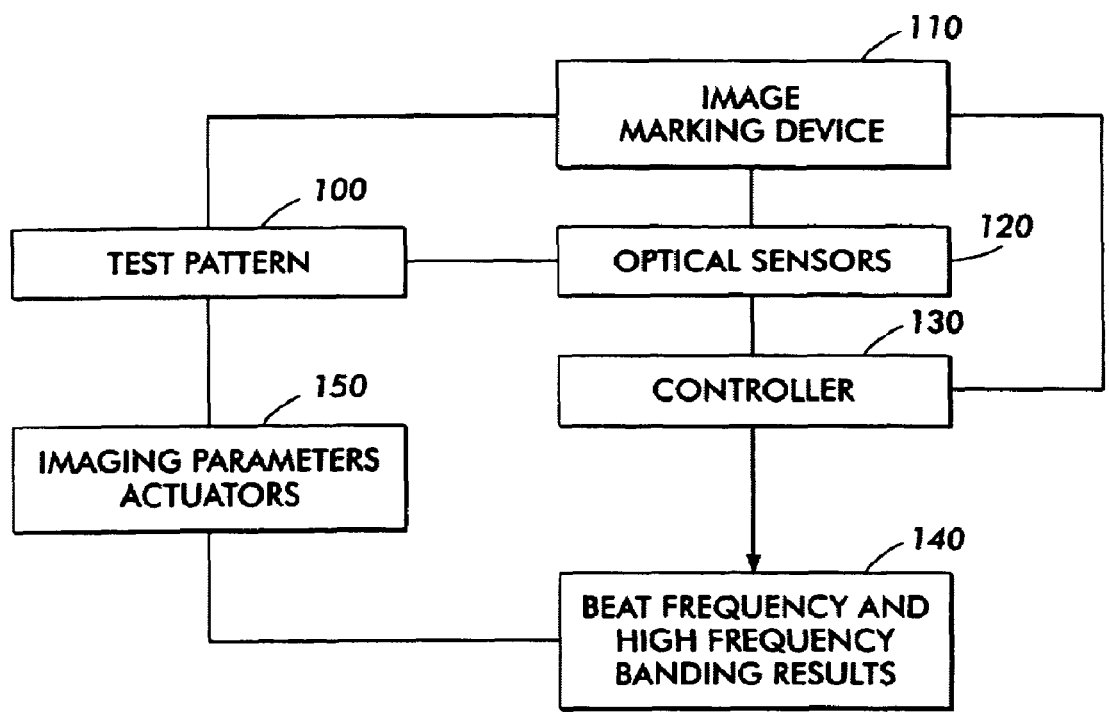
FIG. 8 is a block diagram illustrating a system of high frequency banding control, according to various exemplary embodiments.

FIG. 8 is a block diagram illustrating a system to control high frequency banding according to various exemplary embodiments. FIG. 8 is a block diagram illustrating a system, according to various exemplary embodiments, of determining high frequency banding and also, according to other exemplary embodiments, a system of controlling high frequency banding through a feedback control loop. As shown in FIG. 8, the system is part of an image marking device 110 having a receiving member. The image marking device is functionally coupled to optical sensors 120 arranged on the receiving member of the marking device 110. The purpose of the optical sensor 120 is to sense the reflectance from a test pattern 100 being imaged by the image marking device 110. A controller 130 is functionally coupled to both the image marking device 110 and the optical sensors 120 in order to receive the reflectance signal measured by the optical sensors 120. The controller is also used to process the received signal and determine the beat frequency, phase, and amplitude which are then used to determine the frequency, phase and amplitude of high frequency banding results 140.

According to various exemplary embodiments, the determination of high frequency banding can be performed by the controller 130 to adjust imaging parameters by the use of actuators 150 in order to decrease the extent of high frequency banding before conducting other imaging of the test pattern 100.

Figure 9:
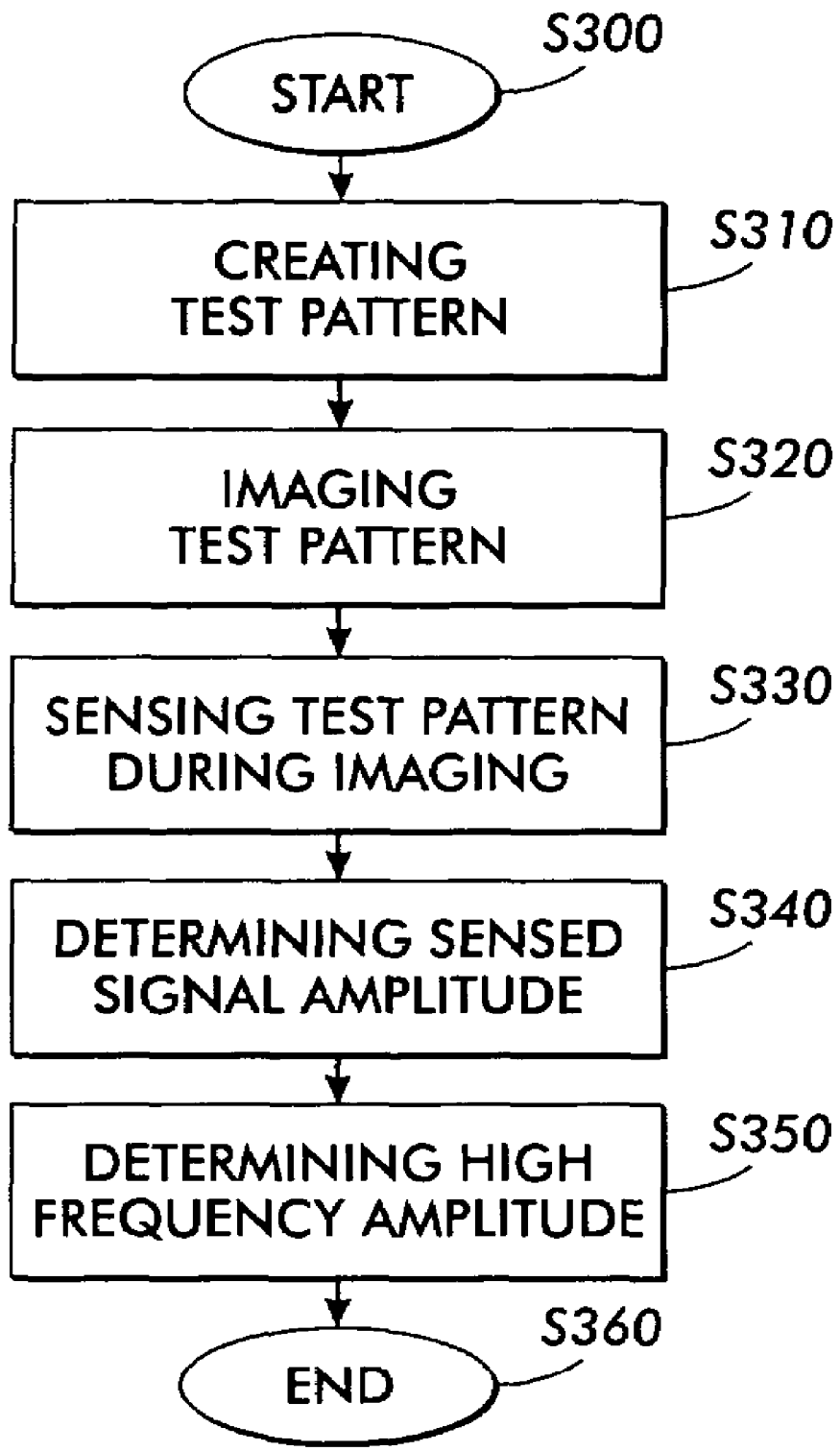
FIG. 9 is a flowchart illustrating a method of determining the amplitude of high frequency banding according to various exemplary embodiments.

FIG. 9 is a flowchart illustrating a method of determining the amplitude of high frequency banding when the frequency of high frequency banding is known, according to various exemplary embodiments. As shown in FIG. 9, the method starts at step S300 and continues to step S310 during which a test pattern is created. According to various exemplary embodiments, the test pattern created during step S310 corresponds to a frequency of high frequency banding of the marking device that is already known.

Figure 10A:
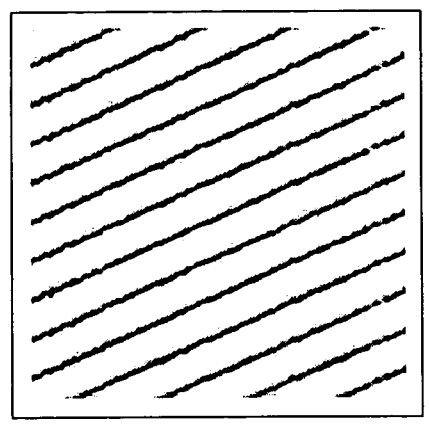
FIGS. 10A and 10B are illustrations of a test pattern and its corresponding optical sensor response according to various exemplary embodiments.

For example, FIG. 10A shows a test pattern for detecting the amplitude of a known frequency of high frequency banding. On FIG. 10A, the process direction is vertical, and the diagonal lines are all parallel and ultimately dark and light. However, the angle of the diagonal lines is calculated such that, in a vertical direction, all the lines that pass through a trough of the high frequency banding are aligned on the same array-type pixels and all the lines that pass through a peak of the high frequency banding are also aligned on a different set of array-type pixels. The angle of the diagonal lines and the spacing between the diagonal lines is specifically chosen to fit the known frequency of high frequency banding of the marking device. Accordingly, monitoring these test patterns, according to various exemplary embodiments, provides a measure of the extent of the high frequency banding, i.e., a measure of the deleterious nature of the high frequency banding of the marking device. According to various exemplary embodiments, if multiple banding frequencies for high frequency banding are present and known, then multiple test patterns are created and used. When the test patterns are created, then control continues to step S320.

Figure 10B:
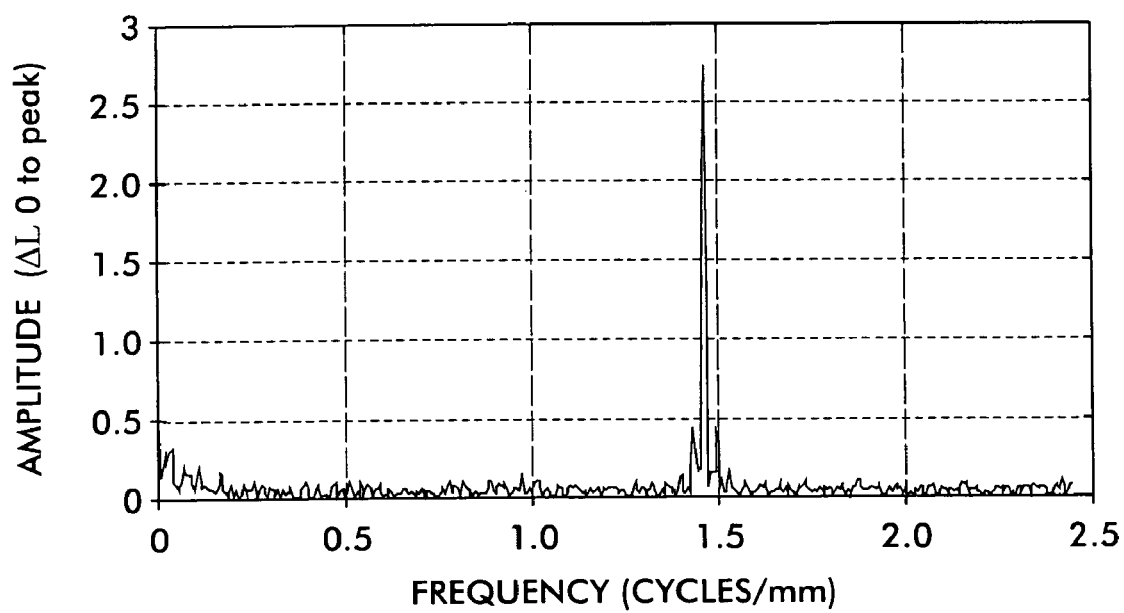

During step S320, a test pattern is imaged using array-type optical sensors. Next, control continues to step S330, where the array-type signal emitted by the array type optical sensors during the imaging of the test pattern in step S320 is measured. Next, during step S340, the array-type signal is processed, as illustrated in FIG. 10B, where a Fourier transform of the signal measured by the array optical sensors is performed in order to determine the amplitude of the high frequency banding. Alternative methods of extracting the amplitude of a periodic signal may also be used. Next, during step S350, the amplitude of the periodic variation at the known frequency of high frequency banding is determined. When the amplitude of the known frequency of high frequency banding is determined during step S350, then control continues to step S360, where the method ends.

According to various exemplary embodiments, the amplitude of the peak and the expected frequency of high frequency banding is proportional to the magnitude, or extent, of the high frequency banding of the marking device. As such, this method can be used as a diagnostics method in order to determine how deleterious high frequency banding is for a given marking device.

Figure 11:
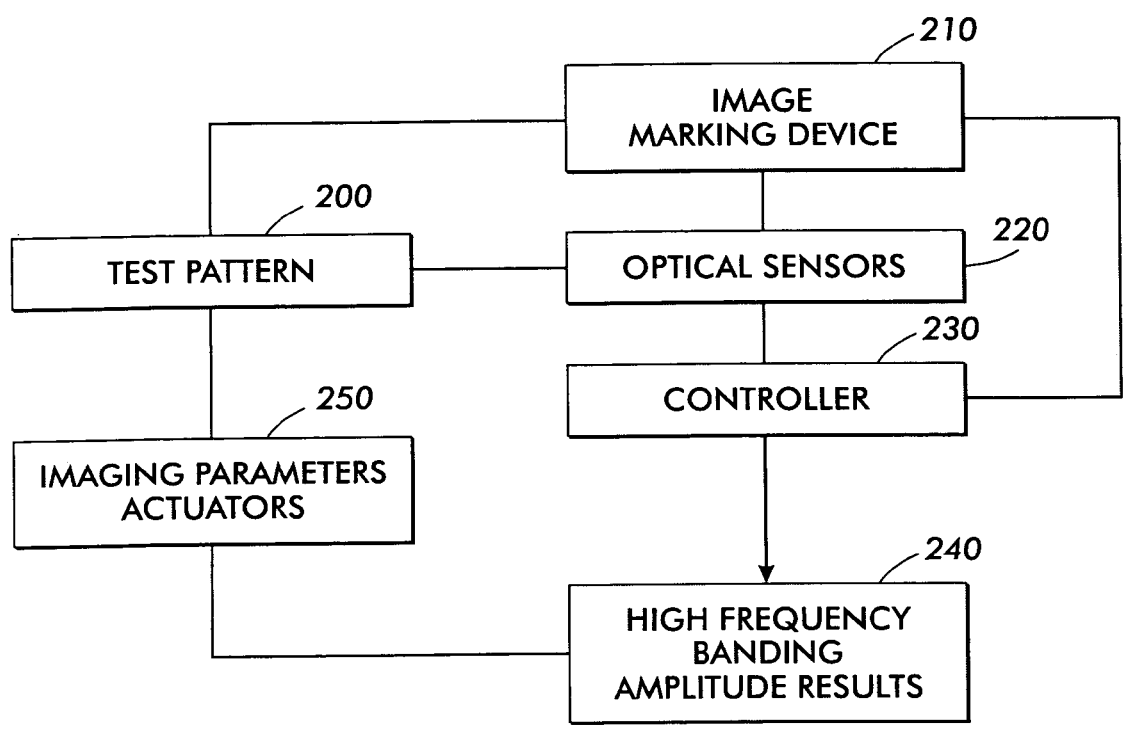
FIG. 11 is a block diagram illustrating a system of determining the amplitude of high frequency banding and adjusting imaging parameters through a feedback control loop.

FIG. 11 is a block diagram illustrating a system to determine amplitude of high frequency banding and adjusting the imaging parameters of the marking device in order to reduce high frequency banding based on the measured amplitude, according to various exemplary embodiments. As shown in FIG. 11, the system includes a test pattern 200 that is imaged by an image marking device 210, and optical sensors 220 that are arranged on the receiving member of the marking device 210. According to various exemplary embodiments, both the image marking device 210 and the optical sensors 220 are functionally coupled to a controller 230. The controller 230 is capable of calculating and determining the amplitude of the high frequency banding at the known frequency of high frequency banding of the image marking device 210. When the controller 230 calculates the amplitude results of high frequency banding 240, the controller 230 adjusts the imaging parameters 250 on the basis of the amplitude results of high frequency banding 240. When the imaging parameters 250 are adjusted by the controller, according to various exemplary embodiments, the test pattern 200 is imaged with the new imaging parameters 250. According to various exemplary embodiments, the optical sensors 220 sense the reflectance from the test pattern 200 imaged on the basis of the adjusted imaging parameters 250.

Figure 12:
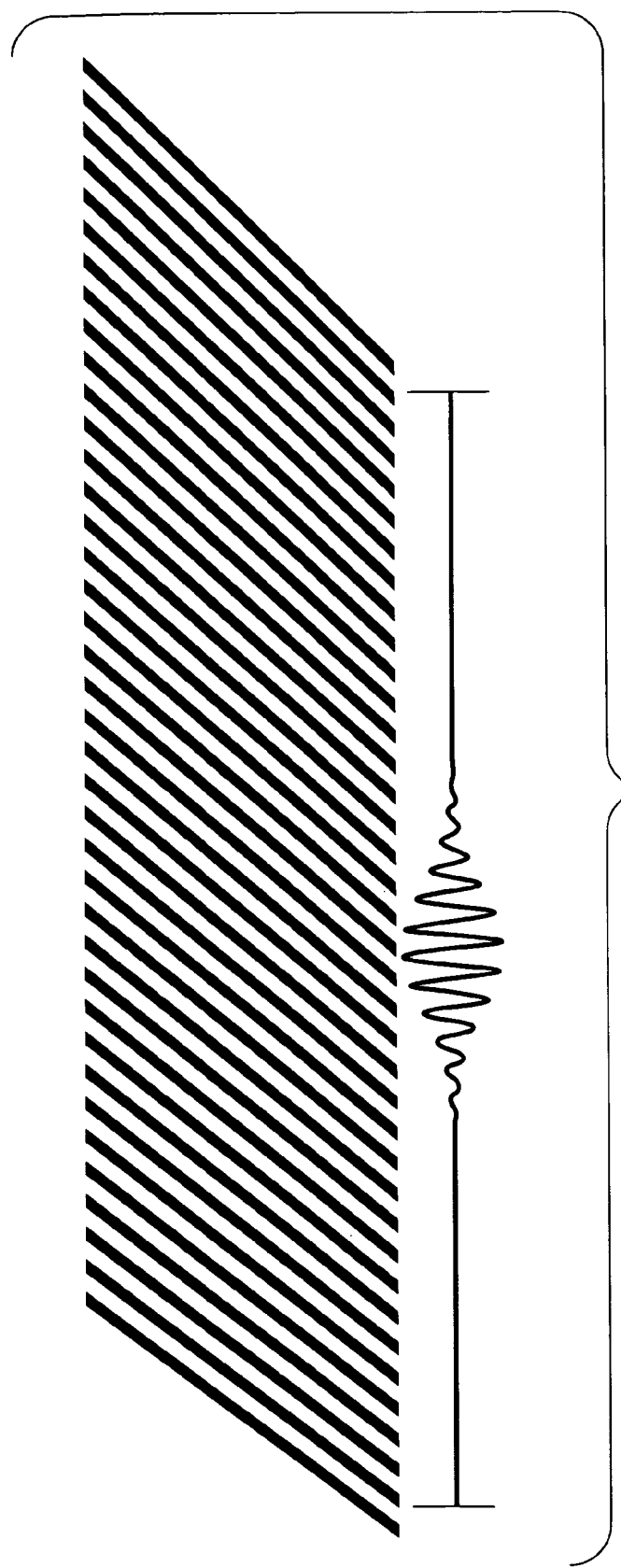
FIG. 12 is an illustration of a "falling domino" test pattern according to various exemplary embodiments.

FIG. 12 is an illustration of another test pattern, according to various exemplary embodiments of this invention, used to determine high frequency banding. In FIG. 12, the test pattern is a series of diagonal lines that are equidistant in space, but which slope varies continuously, in a "falling domino" pattern. The frequency range that can be detected with the test pattern described in FIG. 12 is proportional to the difference in the slope of the left most line in the test pattern and the right most line in the test pattern. When the slope of the diagonal lines is such that the peaks and troughs of the high frequency banding align with the diagonal line spacing, the pattern beats with the high frequency banding. The sensor response will change as shown at the bottom of the test pattern in FIG. 12. The maximum amplitude of this oscillating signal is proportional to the amplitude of the high frequency banding. The frequency of the high frequency banding can be determined from the position of the maximum amplitude of the response in the cross process direction and from the slopes of the "falling dominos" test pattern. Signal processing of the sensor response can increase the sensitivity of the technique in determining the amplitude and frequency in the presence of sensor noise. The test pattern illustrated in FIG. 12 allows for the measurement of the frequency and amplitude of high frequency banding in a similar manner as described above for the "fan like" test pattern.

While the invention has been described in conjunction with the exemplary embodiments, these embodiments should be viewed as illustrative, not limiting. Various modifications, substitutes, or the like are possible within the spirit and scope of the invention.

What is claimed is:

1. A method of measuring high frequency banding, comprising:
    creating at least one test pattern;
    sensing the at least one test pattern with one or more sensors;
    determining a beat frequency based on the at least one test pattern; and
    determining a frequency, phase and amplitude of the high frequency banding based on the beat frequency.
2. The method of claim 1, wherein the at least one test pattern is a fan pattern.
3. The method of claim 2, wherein the fan pattern comprises lines that are equidistant from each other.
4. The method of claim 1, wherein the at least one test pattern is a falling domino pattern.
5. The method of claim 1, wherein the at least one test pattern is a diagonal line pattern.
6. The method of claim 1, wherein the one or more sensors are array-type sensors.
7. The method of claim 1, wherein the one or more sensors are point sensors.
8. The method of claim 7, wherein the at least one test pattern is a periodic variation of gray level in a process direction.
9. The method of claim 1, wherein the beat frequency is determined from a signal sensed by the one or more sensors.
10. The method of claim 2, wherein determining the beat frequency comprises:
    separating the fan pattern into a top portion and a bottom portion;
    measuring a signal sensed by the one or more sensors for each of the top portion and the bottom portion;
    determining a location of a main peak for each of the top portion and the bottom portion; and
    averaging the location of the main peak of the top portion and the main peak of the bottom portion.
11. The method of claim 10, wherein a column-wise sum of the test pattern sensed by the optical sensors to the top and bottom portions of the test pattern is performed.
12. The method of claim 10, wherein determining the location of the main peak for each of the top portion and the bottom portion comprises
    eliminating a linear trend in the signal sensed by the one or more sensors for each of the top portion and the bottom portion.
13. The method of claim 10, wherein averaging the location of the main peak of the top portion and the main peak of the bottom portion comprises
    averaging the location of a maximum peak of the top portion and a maximum peak of the bottom portion.
14. The method of claim 10, wherein averaging the location of the main peak of the top portion and the main peak of the bottom portion comprises
    averaging the location of a minimum peak of the top portion and a minimum peak of the bottom portion.
15. The method of claim 10, wherein
    the frequency of high frequency banding is determined by a sum of the beat frequency and a frequency of the test pattern.
16. The method of claim 15, wherein
    the phase of high frequency banding is determined by phase=$d_{max} \times \pi/2 \times 4/p$; wherein
    $d_{max}$ is a distance between a maximum peak and a position of a peak corresponding to the beat frequency, and p is a period of the high frequency banding.
17. The method of claim 16, wherein determining the amplitude of the high frequency banding comprises
    measuring the signal sensed by the one or more sensors;
    measuring an amplitude of the signal sensed by the one or more sensors;
    determining a value amount of high frequency banding based on the amplitude of the signal sensed by the one or more sensors.
18. A feedback control method of controlling high frequency banding, comprising:
    creating at least one test pattern;
    sensing the at least one test pattern with one or more sensors;
    measuring high frequency banding;
    adjusting imaging parameters based on measured high frequency banding.
19. The method of claim 18, wherein controlling high frequency banding is performed using a feedback control routine or application.
20. The method of claim 19, wherein the feedback control routine or application interpolates measured high frequency banding to adjust an imaging output.
21. The method of claim 18, wherein the test pattern is at least one of a fan pattern, a falling domino pattern and a diagonal lines pattern.
22. A method of measuring high frequency banding amplitude, comprising:
    creating at least one test pattern;
    imaging the at least one test pattern with an array-type sensor;
    averaging individual pixel responses of each sensor of the array-type sensor to extract a profile in a cross process direction;
    determining an amplitude of a periodic signal from the profile across the array-type sensor; and
    determining an amplitude of high frequency banding based on the amplitude of the periodic signal.
23. The method of claim 22, wherein determining the amplitude of the periodic signal is performed via a Fourier transform or another signal processing method that extracts an amplitude of a periodic signal.
24. A method of claim 22, wherein the amplitude of high frequency banding is determined by calculating an amplitude of a peak in a Fourier transform or in another signal processing method.
25. The method of claim 22, wherein the at least one test pattern is made of substantially diagonal, substantially parallel lines.
26. The method of claim 25, wherein the substantially diagonal, substantially parallel lines are halftoned.

27. The method of claim 25, wherein a spacing between the substantially diagonal, substantially parallel lines is chosen so as to beat with the high frequency banding in substantially the cross process direction.

28. The method of claim 22, wherein the at least one test pattern is made of inclined, substantially parallel lines, and wherein an inclination angle of the inclined, substantially parallel lines increases from a first side of the test pattern to a second side of the test pattern, opposite the first side.

29. The method of claim 28, wherein the inclined, substantially parallel lines are halftoned.

30. The method of claim 25, wherein the spacing between the substantially diagonal, substantially parallel lines is chosen so as to beat with the high frequency banding in substantially the cross process direction.

31. A system for measuring high frequency banding in a marking device with a receiving member, comprising:
optical sensors arranged on the receiving member, the optical sensors sensing at least one test pattern on the receiving member;
a controller functionally coupled to the optical sensors and to the marking device;
the controller determining a beat frequency based on the at least one test pattern; and
the controller determining a frequency and a phase of the high frequency banding based on the beat frequency.

32. The system of claim 31, wherein the at least one test pattern is a fan pattern.

33. The system of claim 31, wherein the at least one test pattern is a falling domino pattern.

34. The system of claim 31, wherein the at least one test pattern is a diagonal line pattern.

35. The system of claim 31, wherein the one or more sensors are array-type sensors.

36. The system of claim 31, wherein the one or more sensors are linear sensors.

37. The system of claim 36, wherein the at least one test pattern is a periodic variation of gray level in a process direction.

38. The system of claim 31, wherein the controller determines the beat frequency from a signal sensed by the one or more sensors.

39. The system of claim 31, wherein the controller determines the beat frequency by:
separating a fan pattern into a top portion and a bottom portion;
measuring a signal sensed by the one or more sensors for each of the top portion and the bottom portion;
determining a location of a main peak for each of the top portion and the bottom portion; and
averaging the location of the main peak of the top portion and the main peak of the bottom portion.

40. The system of claim 39, wherein a column-wise sum of the test pattern sensed by the optical sensors to the top and bottom portions of the test pattern is performed.

41. The system of claim 39, wherein determining the location of the main peak for each of the top portion and the bottom portion comprises
eliminating a linear trend in the signal sensed by the one or more sensors for each of the top portion and the bottom portion.

42. The system of claim 39, wherein averaging the location of the main peak of the top portion and the main peak of the bottom portion comprises:
averaging a location of a maximum peak of the top portion and a maximum peak of the bottom portion.

43. The system of claim 39, wherein averaging the location of the main peak of the top portion and the main peak of the bottom portion comprises:
averaging a location of a minimum peak of the top portion and a minimum peak of the bottom portion.

44. The system of claim 39, wherein the frequency of high frequency banding is determined by a sum of the beat frequency and a frequency of the test pattern.

45. The system of claim 44, wherein
the phase of high frequency banding is determined by phase $= d_{max} \times \pi/2 \times 4/p$; wherein
$d_{max}$ is a distance between a maximum peak and a position of a peak corresponding to the beat frequency, and p is a period of the high frequency banding.

46. The system of claim 45, wherein determining the amplitude of banding comprises:
measuring the signal sensed by the one or more sensors;
measuring an amplitude of a signal sensed by the one or more sensors;
determining a value of the high frequency banding based on the amplitude of the signal sensed by the one or more sensors.

47. A feedback control system of controlling high frequency banding on a marking device with a receiving member, comprising:
optical sensors arranged on the receiving member, the optical sensors sensing a test pattern on the receiving member;
a controller functionally coupled to the optical sensors and to the marking device, and capable of measuring high frequency banding; and
the controller adjusting imaging parameters based on the high frequency banding.

48. The system of claim 47, wherein
the controller adjusts the imaging parameters by actuating at least one of an electromechanical actuator and an exposure actuator in response to the high frequency banding; and
the at least one of the electromechanical actuator and the exposure actuator adjusts an amount of high frequency banding in response to an actuation.

49. The system of claim 47, wherein the controller uses a feedback control routine or application.

50. The system of claim 49, wherein the controller using the feedback control routine or application interpolates the high frequency banding to adjust an imaging output.

51. The system of claim 47, wherein the test pattern is at least one of a fan pattern, a falling domino pattern and a diagonal lines pattern.

52. A system of measuring high frequency banding amplitude in a marking device with a receiving member, comprising:
one or more array-type sensors arranged on the receiving member, the sensors sensing at least one test pattern on the receiving member;
a controller functionally coupled to the sensors and to the marking device, and capable of measuring an array-type signal for the at least one test pattern;
the controller extracting an amplitude of the periodic signal from the array-type signal; and
the controller determining an amount of high frequency banding based on the amplitude of the periodic signal.

53. The system of claim 52, wherein extracting the amplitude of the periodic signal is performed via a Fourier transform.

54. A system of claim 53, wherein the amount of high frequency banding is determined by calculating an amplitude of a peak in the Fourier transform.

55. The system of claim 52, wherein the at least one test pattern is made of substantially diagonal, substantially parallel lines.

56. The system of claim 55, wherein the substantially diagonal, substantially parallel lines are halftoned.

57. The system of claim 56, wherein the substantially diagonal, substantially parallel, lines on the at least one test pattern are drawn to correspond to the frequency of the high frequency banding.

58. A xerographic marking device with a receiving member, comprising:
   optical sensors arranged on the receiving member;
   at least one electromechanical actuator;
   at least one exposure actuator; and
   a controller functionally coupled to the optical sensor, the electromechanical actuator and the exposure actuator, wherein
   the controller receives a signal from the optical sensors, determines a beat frequency based on the signal, and determines a frequency and phase and high frequency banding based on the beat frequency.

59. The xerographic marking device of claim 58, wherein
   the controller actuates at least one of the electromechanical actuator and the exposure actuator in response to the signal; and
   the at least one of the electromechanical actuator and the exposure actuator adjusts an amount of banding in response to an actuation of the controller.

60. A machine-readable medium that provides instructions for controlling high frequency banding in a xerographic marking device on a receiving member, the instructions, when executed by a processor, cause the processor to perform operations comprising:
   creating at least one test pattern;
   sensing the at least one test pattern with one or more sensors;
   determining a resulting beat frequency based on the at least one test pattern; and
   determining a frequency and phase of high frequency banding based on the beat frequency.

61. A machine-readable medium that provides instructions for controlling high frequency banding in a xerographic marking device on a receiving member, the instructions, when executed by a processor, cause the processor to perform operations comprising:
   creating at least one test pattern;
   sensing the at least one test pattern with one or more sensors;
   measuring high frequency banding;
   adjusting imaging parameters based on the high frequency banding.

62. A machine-readable medium that provides instructions for controlling high frequency banding in a xerographic marking device on a receiving member, the instructions, when executed by a processor, cause the processor to perform operations comprising:
   creating at least one test pattern;
   sensing the at least one test pattern with one or more sensors;
   determining a beat frequency based on the at least one test pattern; and
   determining a frequency and a phase of the high frequency banding based on the beat frequency.

* * * * *